United States Patent [19]

Ueda

[11] Patent Number: 4,924,414

[45] Date of Patent: May 8, 1990

[54] APPARATUS AND METHOD FOR OBTAINING PRIORITY NUMBERS FOR DRAWING FIGURES FORMING A DISPLAY FIGURE

[75] Inventor: Tomoaki Ueda, Kyoto, Japan

[73] Assignee: Daikin Industries, Ltd., Osaka, Japan

[21] Appl. No.: 100,517

[22] Filed: Sep. 24, 1987

[30] Foreign Application Priority Data

Sep. 24, 1986 [JP] Japan .................. 61-225142
Oct. 22, 1986 [JP] Japan .................. 61-251342

[51] Int. Cl.$^5$ ............................................. G06F 3/153
[52] U.S. Cl. ...................................... 364/522; 340/747
[58] Field of Search ............... 364/521, 522; 340/724, 340/747, 729

[56] References Cited

U.S. PATENT DOCUMENTS

| | | | |
|---|---|---|---|
| 4,594,673 | 6/1986 | Holly | 364/521 X |
| 4,700,181 | 10/1987 | Maine et al. | 340/724 X |
| 4,748,572 | 5/1988 | Latham | 364/522 X |
| 4,769,636 | 9/1988 | Iwami et al. | 340/724 |

Primary Examiner—Gary V. Harkcom
Assistant Examiner—Mark K. Zimmerman
Attorney, Agent, or Firm—Beveridge, DeGrandi & Weilacher

[57] ABSTRACT

Figure data processing apparatus and method in which data are sorted in a depth direction by executing hidden surface removing processing on all figure data to which a priority drawing number is not given, writing, in a display memory unit, portions or whole picture elements of figure data obtained after the hidden surface removing processing, again generating picture elements of each drawing figure, detecting entirely visible figures in which the picture element data written in the display memory unit are identical with the picture element data generated at the second time, and giving a drawing priority number to each of the entirely visible figures thus detected. The apparatus is adapted such that drawing figures are successively overwritten in the display memory unit based on the drawing priority numbers, as necessary.

5 Claims, 9 Drawing Sheets (A)  (B)

△ View point    △ View point (C)

△ View point (A)

(B)

APPARATUS AND METHOD FOR OBTAINING PRIORITY NUMBERS FOR DRAWING FIGURES FORMING A DISPLAY FIGURE

BACKGROUND OF THE INVENTION

The present invention relates to a figure data processing apparatus and method, and more particularly to a figure data processing apparatus and method particularly suitable for drawing figures with a hidden surface removing processing and/or a transparent surface processing executed in a three-dimensional graphic display apparatus.

To express a display figure in three dimensions, a three-dimensional graphic display apparatus is conventionally provided to have a hidden surface removing function and a shading function.

As for the hidden surface removing function, there is widely used a depth buffer algorithm in which a depth value for each picture element is stored in a depth buffer so that only the frontmost or innermost picture elements can be drawn.

More specifically, as shown in FIG. 10, x- and y-coordinates data of each picture element supplied from a line segment drawing circuit 51 are supplied to a frame memory 52 and a depth buffer 53 both provided for displaying a figure. An incremental value of brightness value data calculated by a divider 54 is supplied to an adder 55. There, cumulative addition is executed to obtain brightness value data, which are supplied to the frame memory 52 through a logic product gate 56. An incremental value of depth coordinates data (hereinafter referred to as "z-coordinates value data") calculated by a divider 57 is supplied to an adder 58, in which cumulative addition is executed to obtain z-coordinates value data. In a comparator 59, the z-coordinates value data already loaded in the depth buffer 53. Only the z-coordinates value data judged to be in a predetermined relation in size with respect to the loaded value, are loaded in a depth buffer 53. A judgement result signal, representing the result judged by the comparator 59, is supplied to the logic product gate 56, to control the brightness value data applied to the frame memory 52.

Accordingly, either a maximum or a minimum value of z-coordinates value data (to be determined by conditions set for hidden surface removal) is loaded in the depth buffer 53 at all times. Only when z-coordinates value data deviating from the maximum or minimum value have been supplied, the z-coordinates value data in the depth buffer 53 can be renewed and brightness value data can be loaded in the frame memory 52. By executing the above-mentioned operations for all picture element data, figure data in which hidden surface removal has been achieved are loaded in the frame memory 52. Accordingly, based on the contents of the frame memory 52, a display device 50 can display a figure in which hidden surface removal has been made.

In the hidden surface removing function discussed above, a depth buffer 53 of great capacity is required for storing a z-coordinates value for each picture element, in addition to the frame memory 52 for storing color data for each picture element. Further, there are required the comparator 59 for comparing z-coordinates value data calculated for each picture element, with z-coordinates value data loaded in the depth buffer 53, and the logic product gate 56 for controlling a supply of brightness value data to the frame memory 52, which supply is to be finally controlled by a judgement result signal supplied from the comparator 59. Accordingly, the apparatus not only has a complicated arrangement, but also becomes expensive.

In hidden surface removal with the use of the depth buffer 53, the order in which figure data are drawn, is random regardless of the depth order. Accordingly, when the z-data of the edge of a front figure coincide with the z-data of the edge of an inner figure, there are instances where the color of the edge of the inner or front figure is overwritten by the color of the front or inner figure and the color of the inner surface which should not be displayed, is displayed. This results in deterioration in quality of the figure finally displayed.

Further, even if the apparatus is provided with the depth buffer 53 for hidden surface removal, the apparatus cannot be used for transparent surface processing according to either the Gouraud shading function or the Phong shading function as will be discussed later.

To arrive at the above-mentioned shading function, there has been employed, as a primitive method, a method in which brightness value data are also interpolated in executing the linear interpolation (Gouraud shading function). According to this method, however, a stripe is generated at the boundary between drawing figures, resulting in awkward expression of a display figure in three dimensions. In this connection, the recent trend is to employ the Phong shading function in which brightness operation is carried out based on a normal vector of a drawing figure.

According to this Phong shading processing, when a plurality of transparent surfaces exist, figure data of each transparent surface are drawn successively in the depth order after an opaque surface has been drawn. Thus, a natural expression of a display figure in three dimensions can be finally obtained.

In the Phong shading function, figure data are drawn in a predetermined order for each segment. Accordingly, when the drawing order is set such that drawing is made in a direction from an opaque surface to the frontmost transparent surface, accurate brightness value data can be calculated by merely drawing each segment successively.

In an intelligent three-dimensional graphic display apparatus, however, even though the drawing order is previously set such that segments are drawn in a direction from the innermost side to the frontmost side, it is not ensured at all that segments are actually drawn in this previously set order.

More specifically, even though transparent surfaces overlap one another and the drawing order has been previously set such that drawing is made in a direction from the innermost side to the frontmost side, i.e., from an opaque surface 41 to a transparent surface 43 through a transparent surface 42 as shown in FIG. 11, the actual drawing order is not always identical with the previously set depth order if the drawing figures are rotated. It is noted that the term "depth order" hereinafter means a drawing order in which drawing is made from the innermost side to the frontmost side.

It is now supposed that the opaque surface 41 has a brightness value I1, the transparent surfaces 42 and 43 have brightness values I2 and I3, respectively, and transmissivities e2 and e3, respectively, and the correct brightness value to be visible to the eyes is I. In FIG. 11, the following equation is established:

$$I = I3 + e3(I2 + e2I1)$$

When the figures are drawn in depth order, the opaque surface 41 is drawn first, and then, the transparent surfaces 42 and 43 are drawn in this order. Therefore, it is just required to obtain a new brightness value from a brightness value previously operated and loaded in a memory and a brightness value of a surface to be drawn, and to load the new brightness value thus obtained in the memory, each time each surface is drawn.

It is now supposed that the brightness value loaded in the memory is IM and the transmissivity el of the opaque surface 41 is equal to 0. By repeating the same operation (IM = Ii + ei IM) as shown in the following, the IM finally becomes equal to the correct brightness value I:

$$IM = I1 + e1 IM$$

$$IM = I2 + e2 IM$$

$$IM = I3 + e3 IM$$

However, when the surfaces are not drawn in the depth order, for example when the opaque surface 41 is drawn first, and then transparent surfaces 43 and 42 are drawn in this order, the correct brightness value cannot be obtained by repeating the same processing, unlike the case where the surfaces are drawn in the depth order, in that the correct brightness value I is obtained according to the equation of $I = I3 + e3 (I2 + e2I1)$. That is, when operations are made in the following order:

$$IM = I1 + e1 IM,$$

$$IM = I3 + e3 IM,$$

and $$IM = I2 + e2 IM.$$

The final brightness value IM is obtained according to the following equation:

$$IM = I2 + e2 (I3 + e3I1).$$

Accordingly, the IM thus obtained is not identical with the correct brightness value I obtained according to the following equation:

$$I = I3 + e3 (I2 + e2I1).$$

Accordingly, if it is not certain that the drawing order is identical with the depth order, it is required to provide depth buffers of which the number is equal to the number of overlaps of transparent surfaces, and to load z-coordinates values for all picture elements belonging to all surfaces in these depth buffers, after which the order in which brightness values are operated, should be determined based on the z-coordinates values loaded for all picture elements.

It has been required to provide great-capacity memories specially designed for holding brightness value and transmissivity data for each surface, and the same number of such memories are required as the number of surface overlaps, resulting in complicated arrangements and increased cost. Further, even though as many specially designed memories as the number of transparent surfaces may be provided, there are instances where the same surfaces do or do not overlap each other dependent on their coordinate transformation, as in the transparent surfaces shown in FIG. 11. If the surfaces overlap each other, the transparent surfaces should be divided in order to eliminate surface overlap. That is, the above-mentioned specially designed memories need to have a considerable redundancy, and such division required a complicated processing.

Further, the processing can be executed for only overlapping transparent surfaces of which the number is determined by the number of memories. Thus, great extensibility cannot be expected and efficient utilization of memory is reduced.

In order to overcome the above-mentioned problems it is considered to provide a software program for depth directional sorting processing in which all transparent surfaces are rearranged in the depth direction (hereinafter referred to as Z-sorting processing). However, the operation load becomes great, requiring a long period of time for the Z-sorting processing. Thus, the time required for the Phong shading is disadvantageously lengthened.

SUMMARY OF THE INVENTION

It is an object of the present invention to provide a figure data processing apparatus in which the time required for figure sorting processing in the depth direction is shortened.

It is another object of the invention to provide a figure data processing apparatus capable of additionally executing transparent surface processing.

It is a further object of the invention to provide a figure data processing apparatus capable of reliably preventing the colors of the edges of inner figures from being displayed, when drawing figures overlap one another.

It is still another object of the invention to provide a figure data processing apparatus capable of improving figure drawing speed even though drawing figures overlap one another.

It is a still further object of the invention to provide a simplified figure data processing apparatus.

In order to achieve the above-mentioned objects, the figure data processing apparatus in accordance with the present invention comprises:

a segment memory for storing data of all drawing figures constituting a display figure;

priority number memory means for memorizing a drawing priority number for each drawing figure data;

filling means for generating data for all picture elements constituting each drawing figure;

hidden surface removing means for executing hidden surface removing processing on picture element data supplied from the filling means;

a memory for memorizing picture element data supplied from the hidden surface removing means;

filling control means for generating picture element data twice for each drawing figure to which a drawing priority number has not been given yet;

coincidence judging means for judging whether or not all picture element data generated at the second time are identical with the picture element data loaded in the memory; and priority number generating means for generating a drawing priority number based on a data coincidence judgement signal from the coincidence judging means and on the number of loadings of picture element data into the memory.

According to the figure data processing apparatus having the above-mentioned arrangement, data for all drawing figures constituting a display figure are stored in the segment memory, the filling means to be controlled by the filling control means generates data of all picture elements constituting each drawing figure based on all drawing figure data, and hidden surface processing is executed by the hidden surface removing means to store actual figure data into the memory.

Afterwards, the filling control means controls the filling means to generate data of all picture elements constituting each drawing figure.

The coincidence judging means then judges whether or not the figure data in which the hidden surface removing operation has been carried out and which have been stored in the memory, are identical with data of all picture elements constituting each drawing figure, which data are generated after first-mentioned figure data have been stored in the memory. Based on a data coincidence judgement signal from the coincidence judging means, the priority number generating means generates a priority number which represents that the drawing figure is closest to a preset side (the frontmost side or the innermost side). The priority number thus generated is loaded in the priority number memory means.

There are generated data of all picture elements constituting all drawing figures except for the drawing figures of which priority number has been stored. The hidden surface removing processing is executed on the picture element data thus generated. Data of figures actually visible to the eyes are loaded in the memory. The filling means again generates data of all picture elements constituting the same drawing figure. The coincidence judging means judges whether or not the figure data in which hidden surface removing processing has been executed and which have been loaded in the memory, are identical with data of all picture elements constituting each drawing figure, these data being generated after first-mentioned figure data have been loaded in the memory. Based on a judgement signal from the coincidence judging means, there is generated a priority number representing that the drawing figure data are located in the second side from the preset side. The priority number thus generated is loaded in the priority number memory means.

Thereafter, the above-mentioned operations are continued to generate a priority number for data of all drawing figures, and the priority number thus generated is loaded in the priority number memory means.

DETAILED DESCRIPTION OF THE PREFERRED EMBODIMENTS

The following description will discuss in more detail the present invention with reference to the attached drawings.

Figure 8:
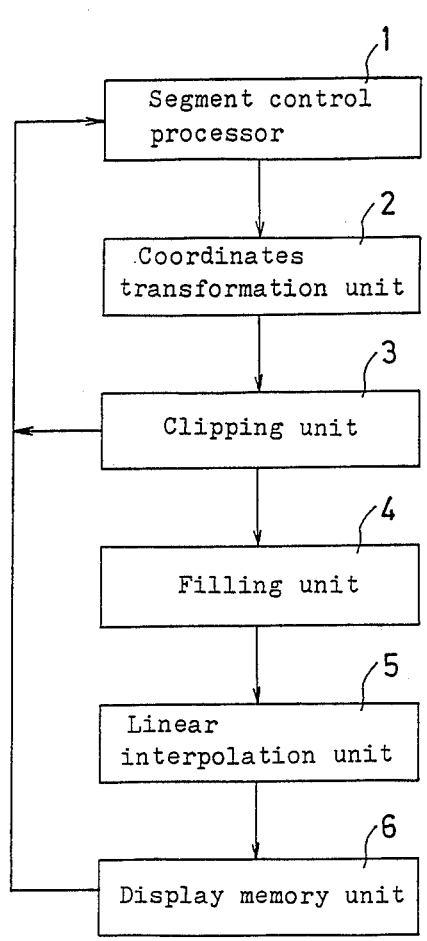
FIG. 8 is a block diagram useful in understanding a principle of operation of a three-dimensional graphic display apparatus.

FIG. 8 is a block diagram useful in understanding a principle of operation for a three-dimensional graphic display apparatus. The apparatus includes:

a segment control processor 1 for supplying apex coordinates values (x, y, z) and an index value I representing the color and the brightness of a drawing figure, to a coordinates transformation unit 2;

a clipping unit 3 for receiving data supplied from the coordinates transformation unit 2;

a filling unit 4 for receiving data supplied from the clipping unit 3;

a linear interpolation unit 5 for receiving data supplied from the filling unit 4; and a display memory unit 6 for memorizing data supplied from the linear interpolation unit 5.

In the coordinates transformation unit 2, data supplied from the segment control processor 1 are subjected to processing such as parallel movement, zooming, scaling, rotary movement and the like. The clipping unit 3 is adapted to clip portions of a drawing figure which has a portion that extends beyond a clip window. This unit 3 is also adapted to detect a drawing figure completely overflowing a preset frame (hereinafter referred to as a pruning figure).

In the filling unit 4, the contours of a drawing figure are linearly interpolated, based on the apex information, to divide the drawing figure into line segments along the scan lines.

In the linear interpolation unit 5, there are generated picture element data between the starting and terminal points of each line segment thus divided.

The display memory unit 6 in which the picture element data thus generated are loaded, is provided with a peak detection holding function in which set z-coordinates value data to be written are compared with previously written z-coordinates value data and greater or smaller z-coordinates value data are held. The display memory unit 6 is also provided with a function for detecting that the set z-coordinates value data are identical with the previously written z-coordinates data.

The peak detection holding function is used for executing the hidden surface removal processing and the data coincidence detection function is used for detecting data representative of entirely visible figures (i.e.

data representative of figures in which data representative of all picture elements constituting each drawing figure are identical with the picture element data written in the display memory).

Data supplied from the clipping unit 3 and the display memory unit 6 (a pruning figure detection signal and an entirely visible figure detection signal) are supplied to the segment control processor 1.

The following description will discuss the operation of a three-dimensional graphic display apparatus arranged as described above.

A host processor (not shown) supplies figure data to the segment control processor 1. The apex coordinates and an index value of each drawing figure are loaded in a segment memory and are supplied to the coordinates transformation unit 2. Data for which coordinates transformation processing has been carried out according to parallel movement, enlargement, reduction, rotary movement and the like, are supplied to the clipping unit 3. In the clipping unit 3, the data are subjected to the clipping processing. Then, in the filling unit 4, the sides of a polygon are linearly interpolated to divide the polygon into line segments along the scan lines. In the linear interpolation unit 5, picture element data as generated between the starting and terminal points of each of the line segments thus obtained. The data thus generated are loaded in the display memory unit 6. Thus, a desired figure can be displayed on a CRT display screen (not shown) based on the contents of the display memory unit 6.

When executing the Z-sorting processing on all drawing figure data, a pruning figure is detected in the clipping unit 3 and the pruning figure detection result is supplied to the segment control processor 1. The pruning figure detection data are loaded with the lowest priority number (for example 65535) in an area corresponding to the pruning figure data which have been loaded in the segment memory.

In the filling unit 4, the polygon is divided into line segments along the scan lines. The linear interpolation unit 5 generates data representative of dots between the starting and terminal points of each of the line segments thus divided, and the data thus generated are loaded in the display memory unit 6. A series of these operations are carried out twice for the same drawing figure data. For the first series of operations, there are selected, as picture element data loaded in the display memory unit 6, data located at the position closest to the preset side (the frontmost side or the innermost side) by the peak detection holding function. By carrying out the second series of operations, picture element data are supplied to the display memory unit 6. At this time, there is detected by the coincidence detection function whether or not the z-coordinates value data previously loaded are identical with z-coordinates value data newly supplied. When data coincidence is judged for all picture elements, it is judged that the figure constituted by these picture elements is an entirely visible figure. Then, the entirely visible figure detection data are supplied to the segment control processor 1. In the segment control processor 1, a priority number is loaded in an area corresponding to the entirely visible figure data loaded in the segment memory.

After a priority number has been loaded in the manner above-mentioned, other drawing figure data than the drawing figure data to which the priority number has been given, are written again in the display memory unit 6 having the peak detection holding function and the coincidence detection function. Then, the picture element data for each drawing figure are loaded in the display memory unit 6. Such writing and loading operations are carried out twice for the same drawing figure to detect entirely visible figures. A priority number on the subsequent ranking is loaded. By repeating these operations successively, a priority number can be given to all drawing figures to be displayed.

Figure 6:
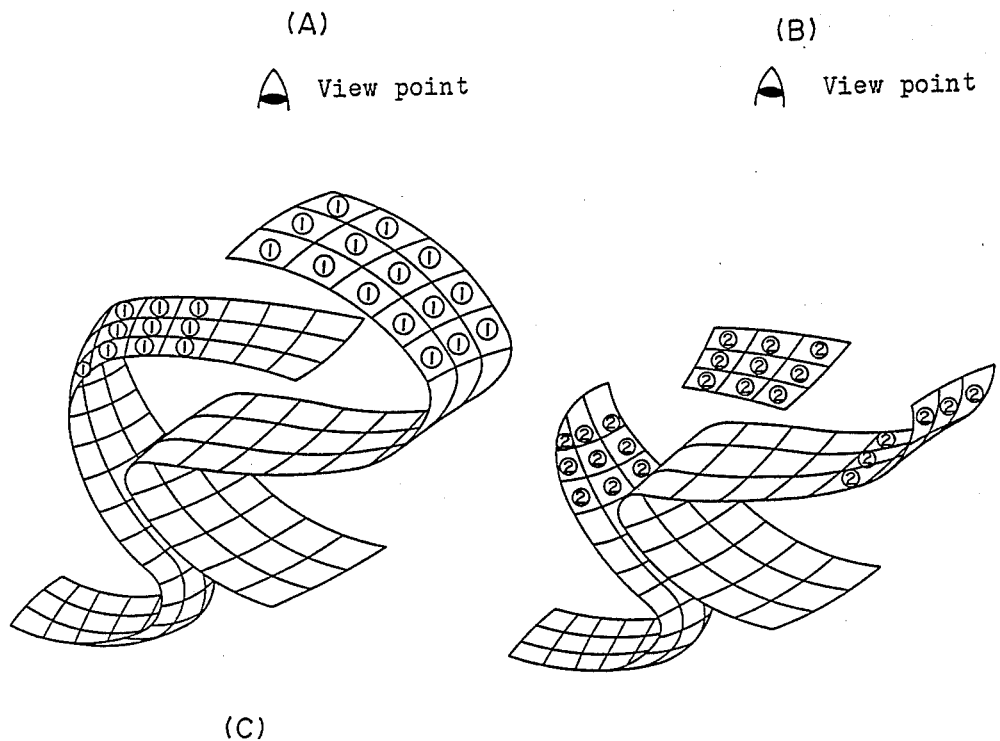
FIG. 6 (A)–(C) are diagrams useful in understanding a depth directional sorting operation.
Figure 6:
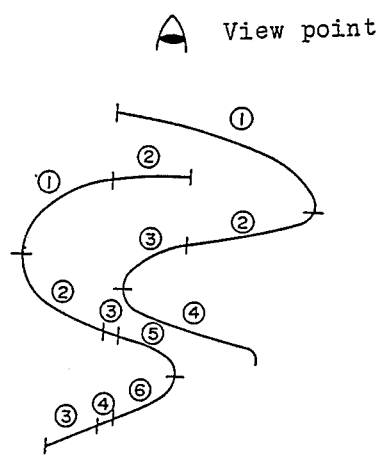

FIG. 6 is useful in understanding how the Z-sorting operation is carried out when two transparent surfaces are present.

In a state where a priority number is not given to any drawing figure data, figure data for which the peak detection holding operation has been carried out, are written in the memory, as shown in FIG. 6 A. Then, there are detected drawing figures in which all picture element data are identical with the figure data stored in the memory. The priority number "1" is given to such drawing figures.

Then, except for the drawing figure data to which the priority number "1" has been given, other figure data, for which the peak detection holding operation has been carried out, are written in the memory (See FIG. 6 B). There are detected drawing figures in which all picture elements are identical with the figure data stored in the memory, and the priority number "2" is given to such drawing figures.

Thereafter, priority numbers "3", "4".... are given in the same manner as above (See FIG. 6 C).

After all priority numbers have been given, the drawing figures can be successively displayed based on the priority numbers in the depth order. This prevents the colors of the edges of inner drawing figures from being displayed. Further, when a transparent surface exists, the transparent surface processing can be executed in the depth order, enabling to achieve accurate shading.

In the embodiment above-mentioned, the number of data writings in the display memory unit 6 is increased to lengthen the entire processing time. However, as the priority-number-giving operation proceeds, the number of data to be written is decreased, whereby the entire processing time required is not increased significantly.

As apparent from the foregoing, it is easy to obtain display data in which the hidden surface removing operation has been carried out, without the use of a special sorting memory. Further, the hidden surface removal can be achieved at a relatively high speed and also can be achieved such that the colors of the edges of inner drawing figures are not displayed at all. The transparent surface processing also can be executed as necessary.

It is to be noted that processing for the pruning figure data having the lowest-rank priority number can be to increase, the display speed.

Figure 1:
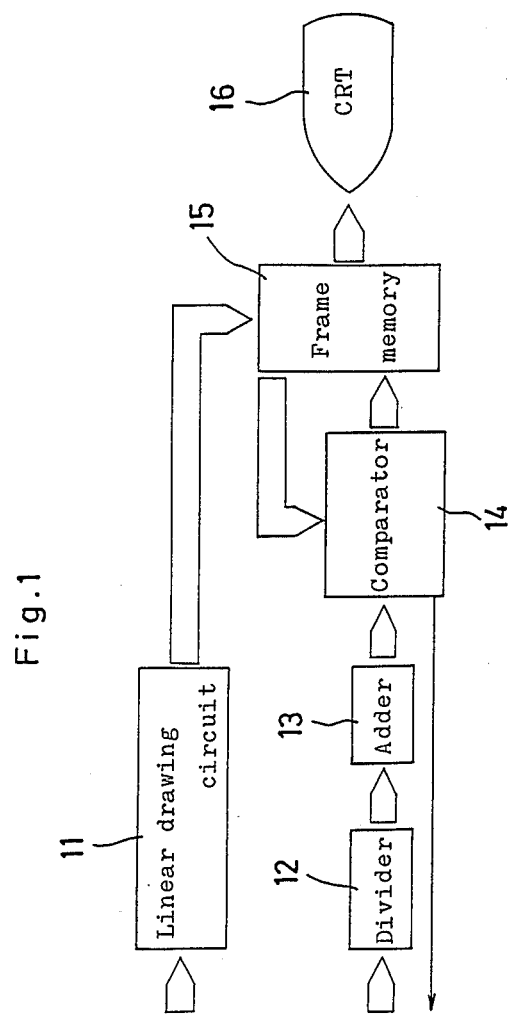
FIG. 1 is a block diagram illustrating the main portions of a figure data processing apparatus in accordance with a first embodiment of the present invention.

FIG. 1 is a block diagram of the figure data processing apparatus in accordance with one embodiment of the present invention.

This figure data processing apparatus comprises:

a linear drawing circuit 11 for receiving x- and y-coordinates values supplied from a linear interpolation circuit for generating ridgeline data based on apex data, whereby said circuit 11 generates x- and y-coordinates values of each picture element;

a frame memory 15 for receiving x- and y-coordinates values supplied from the linear drawing circuit 11;

a divider 12 for calculating an incremental value of a z-coordinate value or an incremental value of an index value, in synchronism with the generation of x- and y-coordinate values of each picture element in the linear drawing circuit 11;

an adder 13 for cumulatively adding the incremental value thus calculated to calculate a z-coordinate value or an index value;

a comparator 14 in which a z-coordinate value supplied from the adder 13 is compared with a z-coordinate value previously loaded in the frame memory 15, the comparator 14 being adapted to supply, to the frame memory 15, the z-coordinates value supplied from the adder 13 based on the result of the comparison (the result of judgment of whether or not the z-coordinates value supplied from the adder 13 is located in a preset side with respect to the z-coordinates value already loaded in the frame memory 15), the comparator 14 being adapted to supply, to a segment control processor or the like (not shown in FIG. 1), a result of the judgment of whether or not the z-coordinates value supplied from the adder 13 is identical with the z-coordinates value already loaded in the frame memory 15; and a CRT display device 16 for displaying a figure based on the contents of the frame memory 15.

The following description will discuss the operation of the figure data processing apparatus having the arrangement above-mentioned.

z-Coordinates values corresponding to x- and y-coordinates values supplied from the linear drawing circuit 11 are calculated in the divider 12 and the adder 13, and the z-coordinates values thus calculated are supplied to the frame memory 15 through the comparator 14, whereby the z-coordinates values of the picture elements for all the drawing figures are loaded in the frame memory 15. Each time the z-coordinates value of each picture element is supplied, this z-coordinates value is compared with a z-coordinates value already loaded in the frame memory 15. Only the z-coordinates value which has been judged to be in a preset side (the frontmost side or the innermost side), is loaded in the frame memory 15. Accordingly, only the peak value of a z-coordinates value corresponding to x- and y-coordinates values, is loaded in the frame memory 15.

Then, a z-coordinates value of each of the picture elements for each drawing figure is calculated. In the comparator 14, it is judged whether or not the z-coordinates value thus calculated is identical with the z-coordinates value already loaded in the frame memory 15. The judgment result is supplied to the segment control processor or the like. Accordingly, when the data coincidence judgment result is obtained for all picture elements constituting each drawing figure, it can be judged that this drawing figure is an entirely visible figure, and a predetermined drawing priority number can be given to this entirely visible figure.

Afterwards, a series of the above-described operation are carried out only for drawing figures to which a drawing priority number has not yet been given. Thus, a predetermined drawing priority number can be given to each of the drawing figures.

After a drawing priority number has been given to all drawing figures, index values of all picture elements constituting each drawing figure are calculated based on the order of the drawing priority numbers thus given, by the divider 12 and the adder 13. The index values thus calculated are loaded, as overwritten, in the frame memory 15. Thus, the index values of all picture elements for which hidden surface removal has been achieved can be held in the frame memory 15.

Accordingly, after the index values of all picture elements constituting all drawing figures have been loaded in the frame memory 15, the contents of the frame memory 15 can be displayed, as they are, on the CRT display device 16, thus displaying a figure in which hidden surface removal has been achieved.

That is, all drawing figures are drawn in the order of the drawing priority numbers given. Therefore, unless one picture element constitutes one polygon, the picture elements corresponding to the edges of hidden surfaces are overwritten by the picture elements constituting a surface figure to achieve high quality figure display in which the colors of the edges of hidden surface do not appear.

When each drawing figure is a transparent surface, all picture element data constituting each drawing figure can be drawn with index value calculation accompanied to display a figure in which the transparent surface processing has been executed.

As apparent from the foregoing, it is required to draw twice each drawing figure in order to carry out one drawing priority-number-giving operation, causing the entire processing to take more time. However, each time a drawing priority number is given, the number of drawing figures to be processed is decreased, thus reducing the rate at which processing time is lengthened. That is, the overall processing time required is considerably reduced as compared with the case where the Z-sorting processing is executed in software. Further, elimination of a depth buffer results in simplification of the arrangement. Yet, the transparent surface processing can be executed as necessary.

Figure 2:
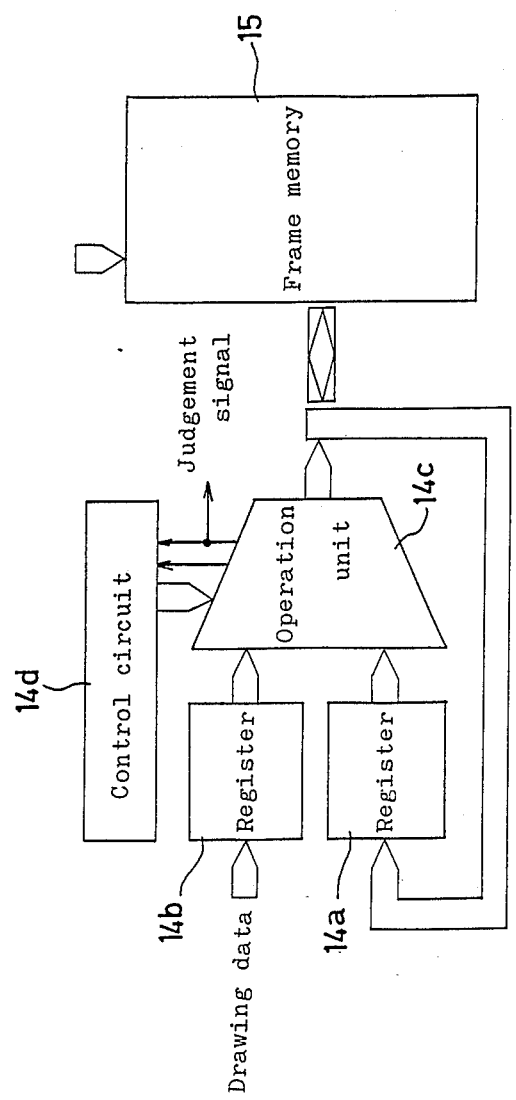
FIG. 2 is a detailed block diagram illustrating the arrangement of units for executing a peak detection holding operation and a coincidence detection operation for detecting entirely visible figures.

FIG. 2 is a block diagram showing in more detail the units for carrying out a peak detection holding operation and a coincidence detection operation for detecting entirely visible figures.

In FIG. 2, the units are seen to include a register 14a for temporarily holding data read out from the frame memory 15, a register 14b for temporarily holding data constituting line segments to be drawn, an operation unit 14c for receiving the contents of the registers 14b and 14a, and a control circuit 14d for controlling the operation of the operation unit 14c.

The register 14b is adapted to be loaded with data in synchronism with data loading in the register 14a. Loaded in the registers 14a and 14b are z-coordinates values corresponding to the same x- and y-coordinates.

The operation unit 14c is provided with a function for calculating a difference between the contents of the registers 14a and 14b, and a function for supplying the contents of one of the registers 14a and 14b, as they are, to the frame memory 15. Either function is selected based on a mode setting signal supplied from the control circuit 14d.

The operation unit 14c supplies to the control circuit 14d a judgement signal representing that the contents of, for example, the register 14a are greater than those of the register 14b, or a judgement signal representing that the contents of both registers are identical. Based on the judgement signal thus supplied, the control circuit 14d supplies to the operation unit 14c a signal representing which register's contents are to be supplied.

The following description will discuss the operation of hidden surface removal.

First, the control circuit 14d supplies to the operation unit 14c a mode setting signal representing that the difference calculation function is to be selected. Meanwhile, supplied to the operation unit 14c are (a) data read out from the frame memory 15 and (b) picture element data constituting line segments to be drawn, the data (a) and (b) being respectively held in the registers 14a and 14b. The operation unit 14c calculates a difference between both data (a) and (b), and supplies to the control circuit 14d positive or negative sign data representing the state of the operation result.

Based on this sign data, the control circuit 14d supplies to the operation unit 14c a mode setting signal representing the register whose contents are to be supplied. Then, the contents of the register thus selected are loaded in the frame memory 15, thus achieving hidden surface removal.

The following description will discuss the coincidence detection operation.

The operation unit 14c calculates a difference between the contents of both registers 14a and 14b, and supplies a judgement signal representing whether or not the difference is equal to 0. By judging whether or not the judgement signal representing that the difference is equal to 0, has been supplied to all picture elements constituting a drawing figure, it can be judged that the drawing figure is an entirely visible figure.

Figure 3:
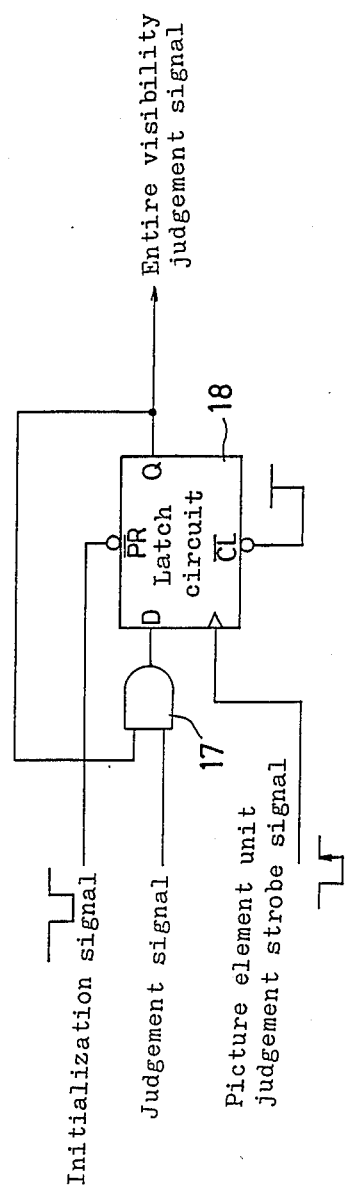
FIG. 3 is an electric circuit diagram showing an arrangement for obtaining an entirely visible figure detection signal based on a data coincidence detection signal.

FIG. 3 shows an electric circuit diagram illustrating an arrangement for automatically judging, based on the judgement signal above-mentioned, whether or not a drawing figure is an entirely visible figure.

The judgement signal is supplied to a D-input terminal of a latch circuit 18 through an AND-gate 17, while a picture element unit judgement strobe signal is supplied to a clock input terminal of the latch circuit 18. A Q-output signal of the latch circuit 18 is supplied to the AND-gate 17.

An initialization signal to be supplied before a figure is drawn, is supplied to a preset input terminal of the latch circuit 18.

Accordingly, by supplying the initialization signal to be supplied before a figure is drawn, to the preset input terminal of the latch circuit 18, the Q-output signal is preset to a high level to open the AND-gate 17.

Afterwards, each time a picture element is drawn, the picture element unit judgement strobe signal is supplied to the clock input terminal to latch an output signal from the AND-gate 17. Since the AND-gate 17 is open at the initial stage, the judgement signal above-mentioned is latched. According to the judgement signal, a Q-output signal is supplied. That is, when the judgement signal is in a high level at all times, the Q-output signal remains in the high level until the next initialization signal is supplied. However, once the judgement signal becomes low, the Q-output signal becomes low to close the AND-gate 17. Accordingly, the Q-output signal remains in a low level until the next initialization signal is supplied.

When the Q-output signal is in the high level immediately before the initialization signal is supplied, it can be judged that the data constitute an entirely visible line segment (including a dot in an extreme situation) or an entirely visible figure. On the other hand, when the Q-output signal is in the low level, it can be judged that the data do not constitute an entirely visible line segment or figure.

Figure 4:
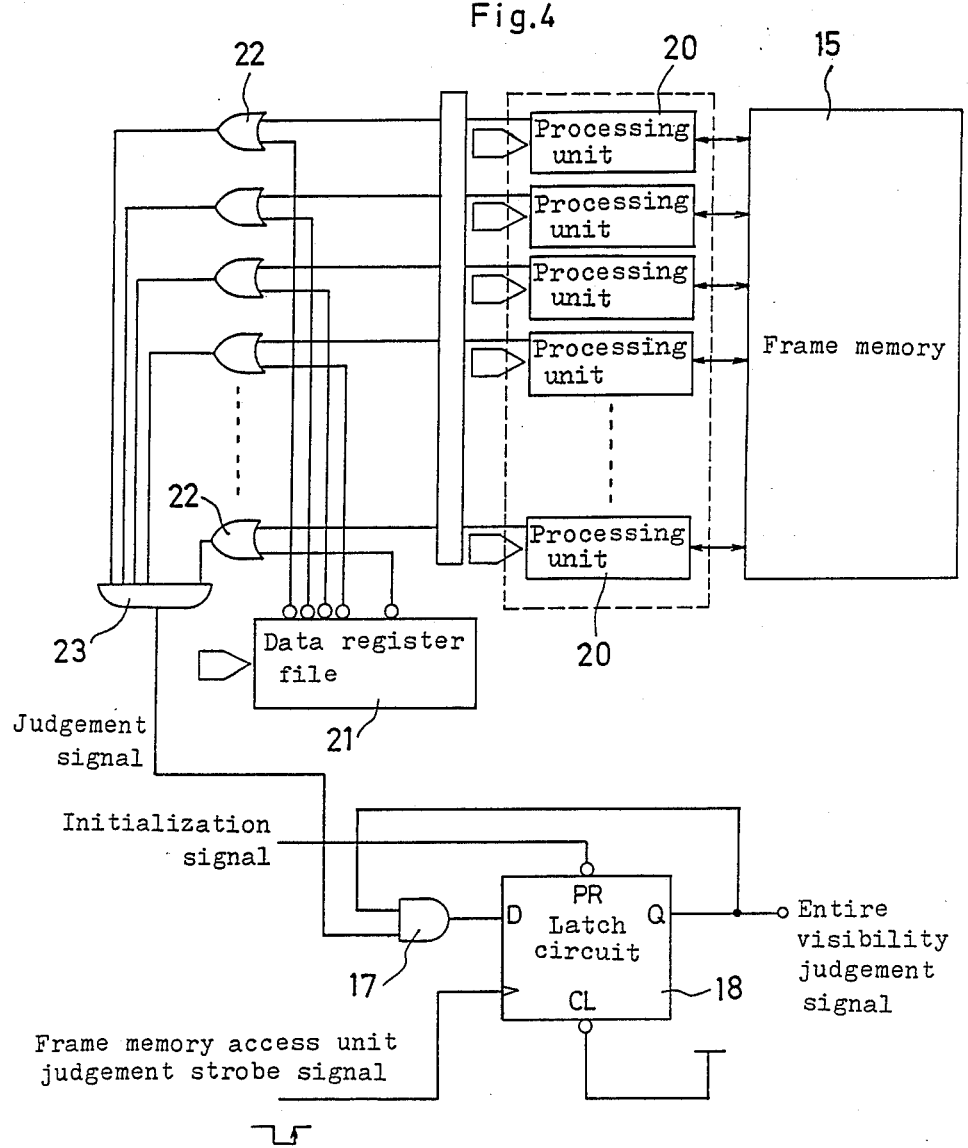
FIG. 4 is a block diagram showing another arrangement of units for executing a peak detection holding operation and a coincidence detection operation for detecting entirely visible figures.

FIG. 4 is a block diagram of another example of the comparator which is the same as that in the embodiment above-mentioned, except for the following arrangement only.

In the embodiment of FIG. 4, there are provided;

a plurality of processing units 20 each including the registers 14a and 14b and the operation unit 14c mentioned earlier, the processing units 20 being disposed in parallel with one another;

a plurality of OR-gates 22 each for receiving a coincidence judgement signal supplied from each of the processing units 20 and a control signal supplied from a data register file 21; and an AND-gate 23 for receiving output signals from the OR-gates 22.

This embodiment of FIG. 4 is arranged such that judgement is not made for each picture element, but a judgement strobe is supplied each time the frame memory is accessed.

The data register file 21 is adapted to supply a low-level signal according to a picture element to be drawn and a high-level signal according to a picture element not to be drawn.

In accordance with the embodiment of FIG. 4, the processing units 20 corresponding to picture elements to be drawn supply a judgement signal to the corresponding OR-gates 22. The data register file 21 supplies a low-level signal to the OR-gates 22 corresponding to the picture elements to be drawn, and a high-level signal to other OR-gates 22. Therefore, when the judgement signal is at a high level, all OR-gates 22 supply a high-level signal and the AND-gate 23 supplies a high-level signal. On the other hand, when the judgement signal is at a low level, the AND-gate 23 supplies a low-level signal.

Figure 7:
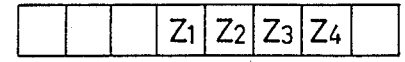
FIG. 7 (A)–(B) are diagrams useful in understanding the relationship between writing pixel data and reading pixel data.
Figure 7:
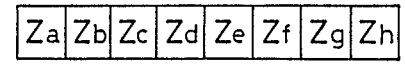

Consequently, based on the level of an output signal supplied from the AND-gate 23, it can be judged whether or not the data constitute an entirely visible line segment or figure. More specifically, there is now given an example in which written pixel data are $Z_1$, $Z_2$, $Z_3$, $Z_4$ as shown in FIG. 7A, while pixel data read in the read cycle are $Z_a$, $Z_b$ ... $Z_h$. When all conditions of $Z_1=Z_d$, $Z_2=Z_e$, $Z_3=Z_f$ and $Z_4=Z_g$ are satisfied, there is supplied a judgement signal representing that the written pixel data constitute an entirely visible line segment or figure. When even one of these conditions is not satisfied, there is supplied a signal representing that these pixel data do not constitute an entirely visible line segment or figure.

Figure 5:
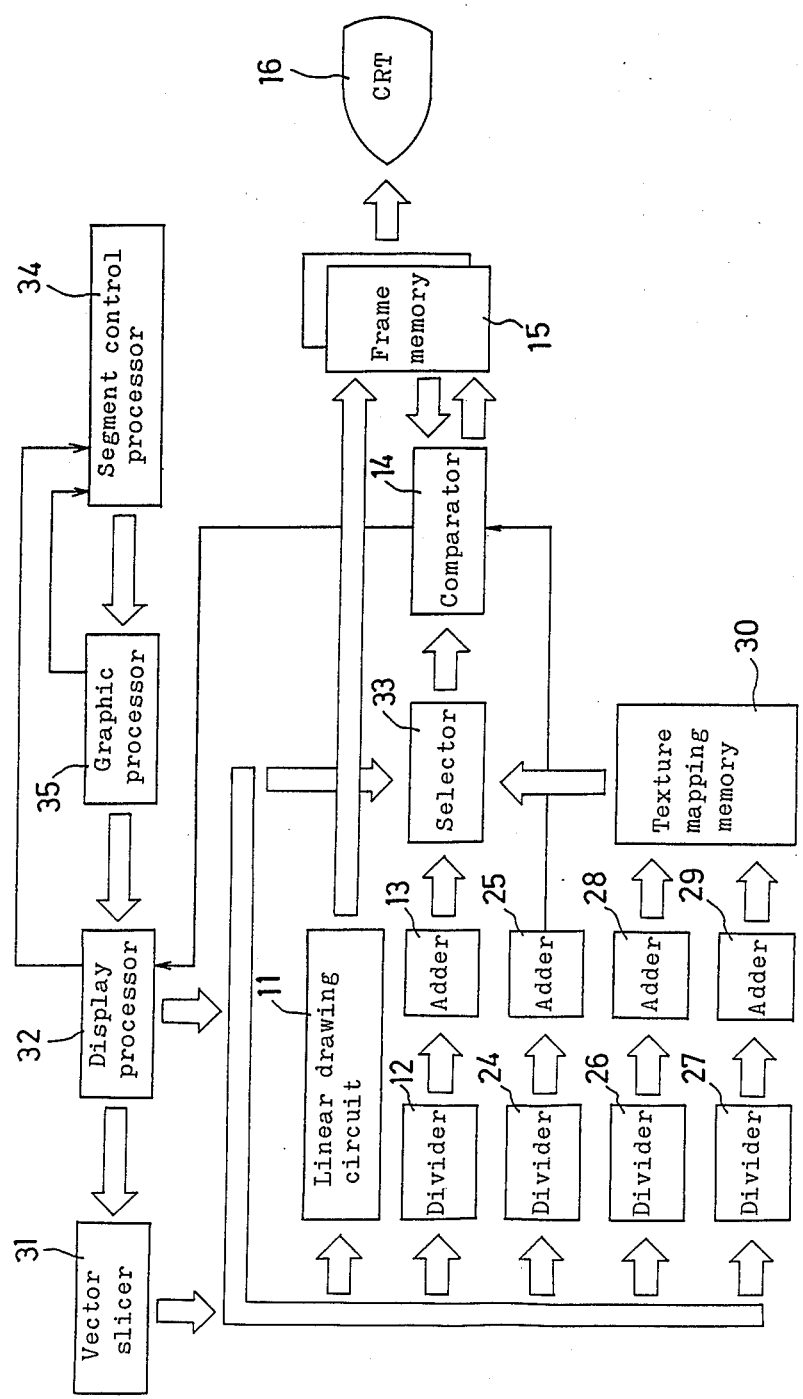
FIG. 5 is a block diagram showing the general arrangement of a graphic display apparatus incorporating the figure data processing apparatus in accordance with the present invention.

FIG. 5 is a block diagram showing an overall arrangement of a graphic display apparatus incorporating the figure data processing apparatus in accordance with the present invention.

In FIG. 5, the graphic display apparatus includes an arrangement identical with the arrangement in FIG. 1, in the following points.

That is, x- and y-coordinates values supplied from the linear drawing circuit 11 are supplied to the frame memory 15, an incremental value of a z-coordinates value or an incremental value of an index value is calculated in the divider 12, and the value thus calculated is cumulatively added in the adder 13 to obtain the z-coordinates value or index value, which is then loaded in the frame memory 15 through the comparator 14.

The following arrangements which are not shown in FIG. 1, are newly added to the apparatus in FIG. 5.

(1) There are provided a divider 24 for calculating an incremental value of a z-coordinates value of a section surface for section display, and an adder 25 for cumulatively adding such incremental value. The result of the cumulative addition is supplied to the comparator 14.

(2) In order to achieve texture mapping, there are provided dividers 26 and 27 for calculating incremental values of u- and v-coordinates values on a texture plane, adders 28 and 29 for cumulatively adding such incremental values, and a texture mapping memory 30 in which data are read out based on both cumulative addition results.

(3) There is provided a vector slicer 31 for supplying vector data to the linear drawing circuit 11 and the dividers 12, 24, 26 and 27 at filling polygons.

(4) There is provided a display processor 32 for supplying Phong shading data.

(5) There is provided a selector 33 for selectively supplying, to the comparator 14, cumulative addition results supplied from the adder 13, data read out from the texture mapping memory 30 and Phong shading data from the display processor 32.

(6) The display processor 32 supplies apex data to the vector slicer 31.

(7) A segment control processor 34 supplies figure data to a graphic processor 35, and data supplied from the graphic processor 35 are supplied to the display processor 32.

(8) A comparison result signal from the comparator 14 is supplied to the display processor 32, and an entirely visible figure detection signal from the display processor 32 and a pruning figure detection signal from the graphic processor 35 are supplied to the segment control processor 34.

The graphic processor 35 is adapted to execute coordinates transformation processing, a clipping processing or the like. The display processor 32 is adapted to extract apex data of a figure to be drawn, to generate Phong shading data, and to judge, based on a comparison result from the comparator 14, whether or not the data constitute an entirely visible figure. The vector slicer 31 is adapted to generate vector data based on the apex data.

In accordance with the apparatus in FIG. 5, a Gouraud shading processing can be executed when the selector 33 is operated to select cumulative addition results supplied from the adder 13, a texture mapping processing can be executed when the selector 33 is operated to select data read out from the texture mapping memory 30, and a Phong shading processing can be executed when the selector 33 is operated to select Phong shading data from the display processor 32.

The frame memory 15 is arranged in the dual-plane system to provide a dynamic display.

Figure 9:
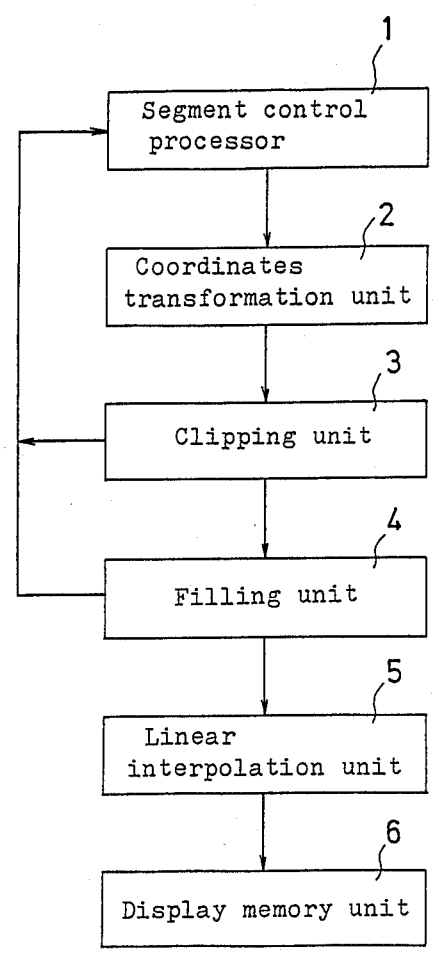
FIG. 9 is a block diagram useful in understanding another principle of operation of a three-dimensional graphic display apparatus.
Figure 10:
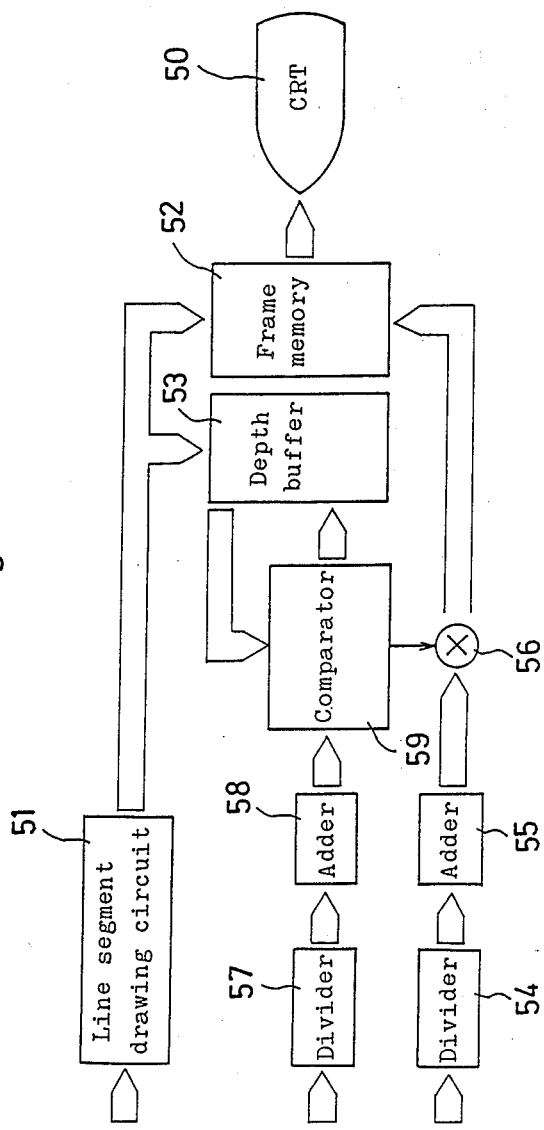
FIG. 10 is a block diagram of a conventional hidden surface removing apparatus.
Figure 11:
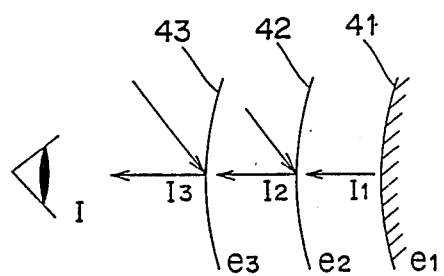
FIG. 11 is a block diagram useful in understanding transparent surface processing in a conventional apparatus.

FIG. 9 is a block diagram useful in understanding another principle of operation for a three-dimensional graphic display apparatus, which is the same as the block diagram in FIG. 8, except for the following points only.

In the block diagram in FIG. 9, the filling unit 4 is provided with a function of detecting an entirely visible figure to supply an entirely visible figure data detection signal to the segment control processor 1, and the display memory unit 6 is not provided with this entirely visible figure detection function.

Accordingly, this three-dimensional graphic display apparatus can execute a figure data processing similar to that in FIG. 8. However, when attention is placed on the priority-number-giving operation only, the apparatus arranged as shown in FIG. 9, can considerably shorten the time required for giving priority numbers, since the number of processings to be executed in the linear interpolation unit 5 and in the display memory unit 6 can be reduced.

It should be understood that the present disclosure is for the purpose of illustration only and various features of the invention may be modified as so desired. For example, it is possible to successively give a priority number, starting from the side opposite to the preset side, instead of starting from the preset side. When intersecting drawing figures exist (when there does not exist any drawing figure to which a priority number is to be given, at the time the twice-filling operations mentioned earlier have been carried out on drawing figures to which a priority number has not been given yet), each of the drawing figures can be further subdivided such that the Z-sorting processing is executed. Alternatively, the presence of intersecting drawing figures can be made known to a host computer and this Z-sorting processing can be interrupted or finished. Numerous other embodiments and modifications can be made by those skilled in the art without departing from the spirit and scope of the present invention.

What is claimed is:

1. Apparatus for obtaining a drawing priority number for a polygonal drawing figure forming a portion of a display figure, said apparatus comprising:

a segment memory for storing drawing figure data representative of all drawing figures constituting each display figure;

filling means for generating picture element data representative of picture elements from drawing figure data received from said segment memory;

filling control means for causing said filling means to generate picture element data representative of a drawing figure not given a priority number;

hidden surface removing means for receiving generated picture element data representative of said drawing figure from said filling means and executing hidden surface removing processing on said picture element data;

a memory for memorizing picture element data supplied thereto from said hidden surface removing means;

said filling control means further causing said filling means to generate picture element data representative of another drawing figure not given a drawing priority number whereafter said hidden surface removing means executes hidden surface removal processing on said picture element data representative of said another drawing figure until picture element data generation and hidden surface removal processing have been performed in succession for each drawing figure not given a drawing priority number, said filling control means thereafter causing said filling means to re-generate picture element data corresponding to one of said drawing figures not given a drawing priority number;

coincidence judging means for judging whether or not all said re-generated picture element data representative of said one drawing figure not given a drawing priority number are identical with picture element data memorized in said memory and providing a coincidence judgement signal indicative thereof;

priority number generating means for generating a drawing priority number for said one drawing figure not given a priority number based on the coincidence judgement signal associated with said one drawing figure and on the number of times said hidden surface removal means has supplied picture element data to said memory before generation of the coincidence judgment signal associated with said one drawing figure;

said filling control means further causing said filling means to re-generate picture element data for another drawing figure not given a drawing priority number whereafter said coincidence judging means judges said re-generated picture element data and said priority number generating means generates a drawing priority number for said another drawing figure until picture element re-generation, coincidence judging, and priority number generating have been performed in succession for each drawing figure not given a drawing priority number whereby all drawing figures are given a drawing priority number; and priority number holding means for holding the drawing priority number generated for each drawing figure.

2. Apparatus for obtaining a display figure comprising overlapping translucent drawing figures, said apparatus comprising;

segment memory means for storing drawing figure data representative of all drawing figures constituting a display figure;

filling means for generating picture element data representative of picture elements from drawing figure data received from said segment memory;

filling control means for causing said filling means to generate picture element data representative of a drawing figure data not given a drawing priority number;

peak detection holding means for receiving generated picture element data representative of said drawing figure not given a priority number from said filling means and storing said generated picture element data only if said peak detection holding means determines that said generated picture element data are located on a preset side with respect to depth coordinates data already stored in said peak detection holding means;

said filling control means further causing said filling means to generate picture element data representative of another drawing figure not given a priority number whereafter said peak detection holding means receives said picture element data representative of said another drawing figure and stores said data if it determines said data are located on a preset side with respect to depth coordinates data already stored;

said filling control means thereafter causing said filling means to re-generate picture element data corresponding to one of said drawing figures not given a drawing priority number;

coincidence judging means for judging whether or not all said re-generated picture element data representative of said one drawing figure not given a drawing priority number are identical with picture element data stored in said peak detection holding means and providing a coincidence judgement signal indicative thereof;

priority number generating means for generating a drawing priority number for said one drawing figure not given a priority number based on the coincidence judgement signal associated with said one drawing figure and on the number of times said peak detection holding means has stored picture element data before generation of the coincidence judgement signal associated with said one drawing figure;

said filling control means further causing said filling means to re-generate picture element data for another drawing figure not given a drawing priority number whereafter said coincidence judging means judges said re-generated picture element data and said priority number generating means generates a drawing priority number for said another drawing figure until picture element re-generation, coincidence judging, and priority number generating have been performed in succession for each drawing figure not given a drawing priority number; and priority number holding means for holding the drawing priority number generated for each drawing figure;

said filling control means being responsive to generation of drawing priority numbers and storing of such priority numbers in said priority number holding means to cause said filling means to generate picture element data for all drawing figures in an order from a side opposite to the preset side to the preset side, according to said drawing priority numbers.

3. Apparatus for obtaining a display figure as set forth in claim 2, further comprising a display memory unit, and wherein said peak detection holding means and said coincidence judging means are disposed in said display memory unit.

4. Method for obtaining a drawing priority number for a polygonal drawing figure forming a portion of a display figure, said method comprising the steps of:

(A) by means of a hidden surface removal processor, executing hidden surface removing processing on figure data representative of a drawing figure not given a drawing priority number;

(B) by means of a filling device and a filling control device, writing, in a display memory unit, picture element data corresponding to said drawing figure not given a priority number from figure data obtained as a result of said hidden surface removing processing;

(C) repeating steps (A) and (B) for another drawing figure not given a drawing priority number until hidden surface removal processing and picture element writing have been performed in succession for each drawing figure not given a drawing priority number;

(D) by means of said filling device and said filling control device, regenerating picture element data corresponding to one drawing figure not given a priority number;

(E) by means of a coincidence judging device, detecting whether said one drawing figure not given a priority number is an entirely visible figure based upon whether picture element data written in said display memory unit are identical with all picture element data corresponding to said one drawing figure generated during said picture element re-generation;

(F) by means of a priority number generator, giving a drawing priority number to said one drawing figure if said one drawing figure is detected to be an entirely visible figure, said priority number for said one drawing figure being based upon the number of times picture element data has been written in said display memory unit before coincidence judging for said one drawing figure; and (G) repeating steps (D), (E) and (F) until all drawing figures are given a drawing priority number.

5. Method for obtaining a display figure comprising overlapping translucent drawing figures, said method comprising the steps of:

(A) by means of a hidden surface removal processor, executing hidden surface removing processing on figure data representative of a drawing figure not given a drawing priority number;

(B) by means of a filling device and a filling control device writing, in a display memory unit, picture element data corresponding to said drawing figure not given a priority number from figure data obtained as a result of said hidden surface removing processing;

(C) repeating steps (A) and (B) for another drawing figure not given a drawing priority number until hidden surface removal processing and picture element writing have been performed in succession for each drawing figure not given a drawing priority number;

(D) by means of said filling device and said filling control device, re-generating picture element data corresponding to one drawing figure not given a priority number;

(E) by means of a coincidence judging device, detecting whether said one drawing figure not given a priority number is an entirely visible figure based upon whether picture element data written in said display memory unit are identical with all picture element data corresponding to said one drawing figure generated during said picture element re-generation;

(F) by means of a priority number generator, giving a drawing priority number to said one drawing figure if said one drawing figure is detected to be an entirely visible figure, said priority number for said one drawing figure being based upon the number of times picture element data has been written in said display memory unit before coincidence judging for said one drawing figure; and (G) repeating steps (D), (E) and (F) until all drawing figures are given a drawing priority number, whereby each drawing figure of a display figure can be displayed based on a transmissivity and index value in a drawing priority number order from a side opposite to a preset side to the preset side.

* * * * *